United States Patent
Bied-Charreton

[11] 3,961,837
[45] June 8, 1976

[54] MAGNETICALLY ACTUATED DEFLECTABLE MEMBRANE PAGE COMPOSER FOR HOLOGRAPHY

[75] Inventors: Philippe Bied-Charreton, Limours; Luigi d'Auria, Chevreuse; Francois Micheron, Gif-sur-Yvette; Jean Pierre Huignard, Chatenay-Malabry, all of France

[73] Assignee: Thomson-CSF, Paris Cedex, France

[22] Filed: Sept. 20, 1974

[21] Appl. No.: 507,970

[30] Foreign Application Priority Data
Sept. 21, 1973 France ............................... 73.33871

[52] U.S. Cl. ............................ 350/3.5; 340/324 R; 350/161
[51] Int. Cl.² ........................ G03H 1/30; G02F 1/19
[58] Field of Search ..................... 350/3.5, 161; 178/7.3 D, 7.5 D; 340/173 LT, 173 LM, 324 M, 324 R, 174 YC

[56] References Cited
UNITED STATES PATENTS

| | | | |
|---|---|---|---|
| 1,525,550 | 2/1925 | Jenkins | 350/161 |
| 3,267,455 | 8/1966 | McGuire et al. | 340/324 M |
| 3,746,785 | 7/1973 | Goodrich | 350/161 |
| 3,798,620 | 3/1974 | Cosentino | 350/3.5 |
| 3,812,490 | 5/1974 | Goodrich | 340/324 R |

*Primary Examiner*—Ronald J. Stern
*Attorney, Agent, or Firm*—Holman & Stern

[57] ABSTRACT

The device comprises a flexible magnetic sheet reflective on one side, at least one magnetic circuit associated with at least one zone of the sheet for deforming the sheet by a modification of the magnetic flux in the magnetic circuit. Exciting means controlled by electrical data vary the magnetic flux so as to modify the reflecting conditions in said zone as a function of the electrical data.

A unit for recording holographical optical memories is disclosed which employs this device.

10 Claims, 5 Drawing Figures

MAGNETICALLY ACTUATED DEFLECTABLE MEMBRANE PAGE COMPOSER FOR HOLOGRAPHY

The present invention relates in a general way to the conversion of electrical information or data, for example binary signals, into optical information or data. More particularly the invention relates to the display and/or recording of electrical data in the optical form.

An object of the present invention is to provide a device for the conversion of electrical data into optical data and also a unit for recording optical memories employing the converting device according to the invention.

The device according to the invention for converting electrical data into optical data comprises a flexible magnetic sheet which is reflective on one of its sides, at least one magnetic circuit associated with at least one zone of said sheet for deforming said zone by a modification of the flux in said circuit and exciting means controlled by said electrical data and adapted to vary said flux and modify the conditions of reflection in said zone as a function of the electrical data.

Further features of the invention will be apparent from the ensuing description with reference to the accompanying drawings given solely by way of example and in which.

Figure 1:
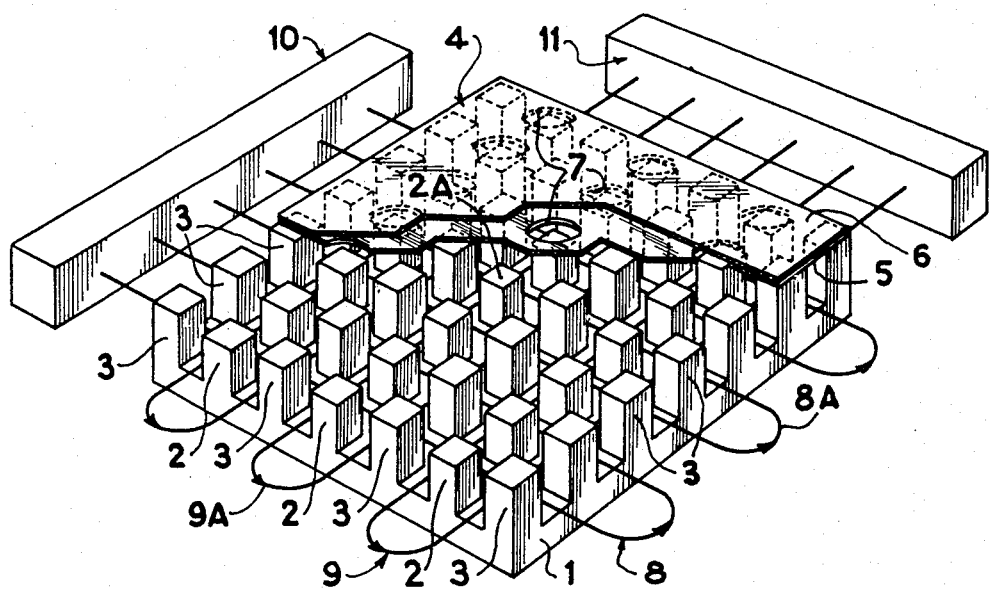
FIG. 1 is a diagrammatic perspective view of a converting device according to a preferred embodiment of the invention.
Figure 2:
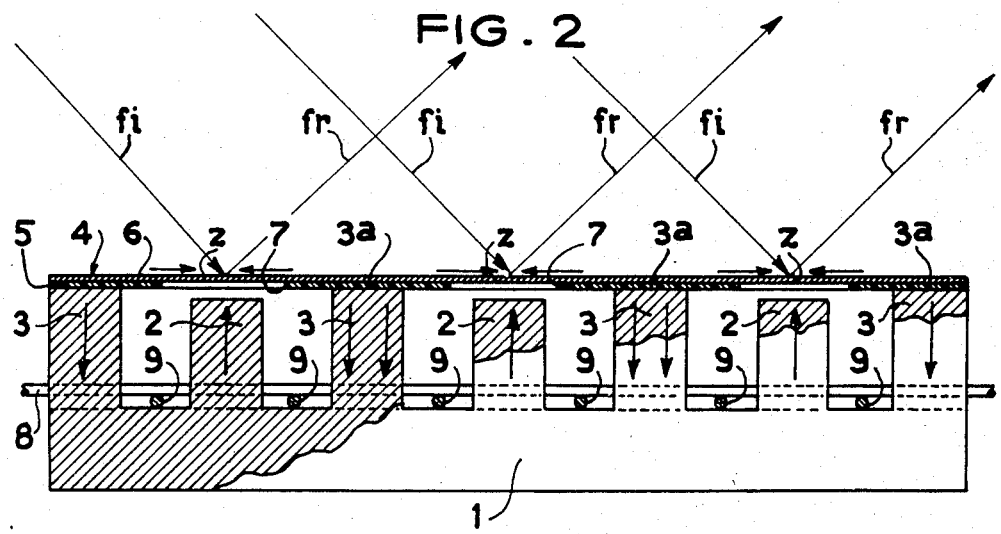
FIG. 2 is a front elevational view, to an enlarged scale, of the device according to the invention, showing in particular the magnetic sheet.

In the embodiment of the invention shown in FIGS. 1 and 2, the device according to the invention comprises a base plate 1 for example of rectangular shape. Projecting from one of the large sides of this plate 1 are studs 2 and 3 which are respectively active and passive and are preferably in one piece with the base plate 1 and have a rectangular section in the presently-described embodiment.

The active studs 2 are slightly shorter than the passive studs 3. All of the studs are disposed in accordance with a configuration of rows and columns, it being understood that columns of active studs alternate with columns of passive studs.

The unit consisting of the base plate and studs is made from a suitable magnetic material. Preferably, a soft ferrite having a square hysteresis loop with a coercive field of the order of 1 oersted is employed. This unit may be manufactured by forming crossed grooves in a plate of ferrite by a method similar to that which is at present employed for the manufacture of gofer memories (see the article "Gofer magnetic memories" in the Review "Onde electrique" of March 1967 page 436).

The device according to the invention also has a magnetic sheet or membrane 4 which has in the illustrated embodiment a very thin support layer 5 of flexible plastics material. There may be employed for this purpose the plastics material manufactured under the trade name "Kapton".

The membrane has a second layer 6 covering the first layer and composed of a magnetic material having a permanent magnetization, its coercive field being distinctly higher than that of the ferrite of the base plate 1 and studs 2 and 3. This field may be 10 to 100 times higher. This magnetic layer is constituted preferably by a plurality of ferromagnetic materials, such as Fe—Ni—Co with optionally certain doping agents whereby the value of the coercive field may be adjusted.

The membrane 4 is secured, for example by adhesion, to the end surfaces 3a of the passive studs 3 so that each active stud faces a given zone $z$ of the membrane. The support layer 5 is provided with an aperture 7 in each of these zones to reduce the stiffness of the membrane and thus facilitate the deformations thereof. The layer 5, instead of having apertures, may also have for the same purpose portions of reduced thickness (not shown).

In order to excite the active studs 2, the device according to the invention has a matrix of exciting wires comprising two groups 8 and 9 of linearly disposed wires which cross at a right angle and are located in the grooves formed between the active and passive studs 2 and 3. By means of a judicious supply to the wires through supply devices 10 and 11, the two groups create in the manner of a matrix around each active stud an exciting current which determines the direction of the magnetic flux in the stud. For example, to excite the stud 2A located in the centre of the plate 1, it is sufficient to send a supply current through the wires 8A and 9A.

As shown in FIG. 2, the membrane 4 is reflective on its side remote from the studs 2 and 3 and can receive, preferably, selectively in each zone $z$ defined by an active stud, an incident beam of light $fi$ which, as will now be explained, is reflected either in a specular manner (as shown in FIG. 2) or in a diffused manner depending on whether the active stud 2 is excited in one direction or the other.

The magnetic layer 6 of the membrane 4 has permanent magnetization which concentrates a given magnetic pole in each zone $z$ in front of an active stud 2. This magnetization is achieved during manufacture by the action of a high magnetizing current maintained in the course of the operation of the device, since the coercive field of the membrane is high.

In FIG. 2 it can be seen that each active stud 2 is in fact placed in a magnetic circuit which comprises a part of the base plate two adjacent passive studs 3, the corresponding zone of the membrane 4 and the airgap between the membrane and the end surface of the considered active stud. In this magnetic circuit, two magnetization states can prevail, which states are controlled by the groups of wires 8 and 9.

Figure 3:
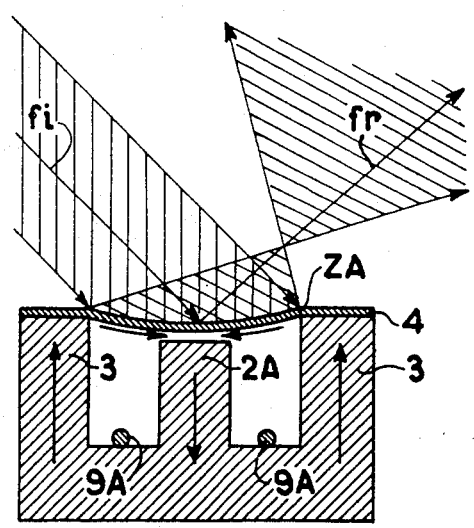
FIG. 3 is a diagrammatic sectional view of an elementary part of the device according to the invention, the magnetic sheet having its deformed configuration.

Assuming that initially the ferrite of the studs and plate is completely demagnetized, it will be understood that the membrane 4 is perfectly planar and acts optically in the manner of a planar mirror. If a current — ½ is passed through the exciting wires surrounding a given active stud (2A and wires 8A and 9A for example) the magnetic circuit of this stud 2A is magnetized so that the concerned zone ZA of the membrane 4 is deformed in that it tends to apply itself against the active stud 2A (FIG. 3). Consequently, the light reflected by the zone ZA will be returned in a direction different from that corresponding to specular reflection. It can therefore be assumed that the concerned zond ZA is in the logic 0 state which is stable when the current in the exciting wires is cut off.

Figure 4:
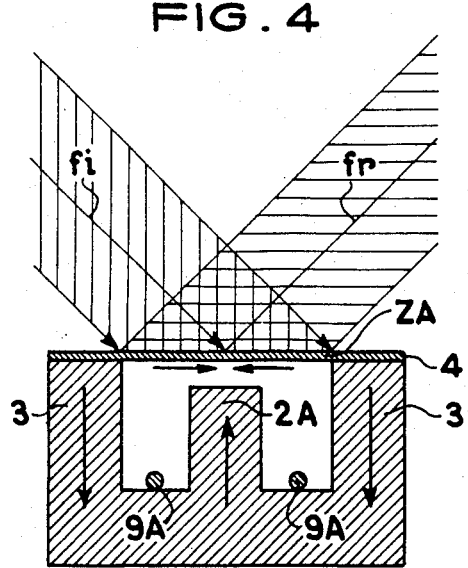
FIG. 4 is a view similar to FIG. 3, the magnetic sheet being undeformed.

To produce a logic 1 state in the same zone ZA of the membrane, a current + ½ is passed through the wires 8A and 9A (FIG. 4). The direction of the flux in the magnetic circuit of the active stud 2A is then reversed. In this case, the reluctance of the circuit will be much higher than in the first case. Inversely, the field B in the airgap will be much weaker and, as the force attracting the zone ZA of the membrane 4 is proportional to the square of the field B, in one case, the membrane will be practically free and, in the other case, it will be attracted. Note that the device according to the invention has two stable states in the absence of electrical excitation. These two stable states, respectively illustrated in FIGS. 3 and 4, are characterized by distinct values of the reluctance of the variable-airgap magnetic circuit.

The device just described can therefore modify a beam of light in accordance with electrical data which are applied thereto in a transitory manner. This device can thus be employed in certain cases for the visual display of certain electrical data, or information but it has its main application in the construction of holographic memories.

Figure 5:
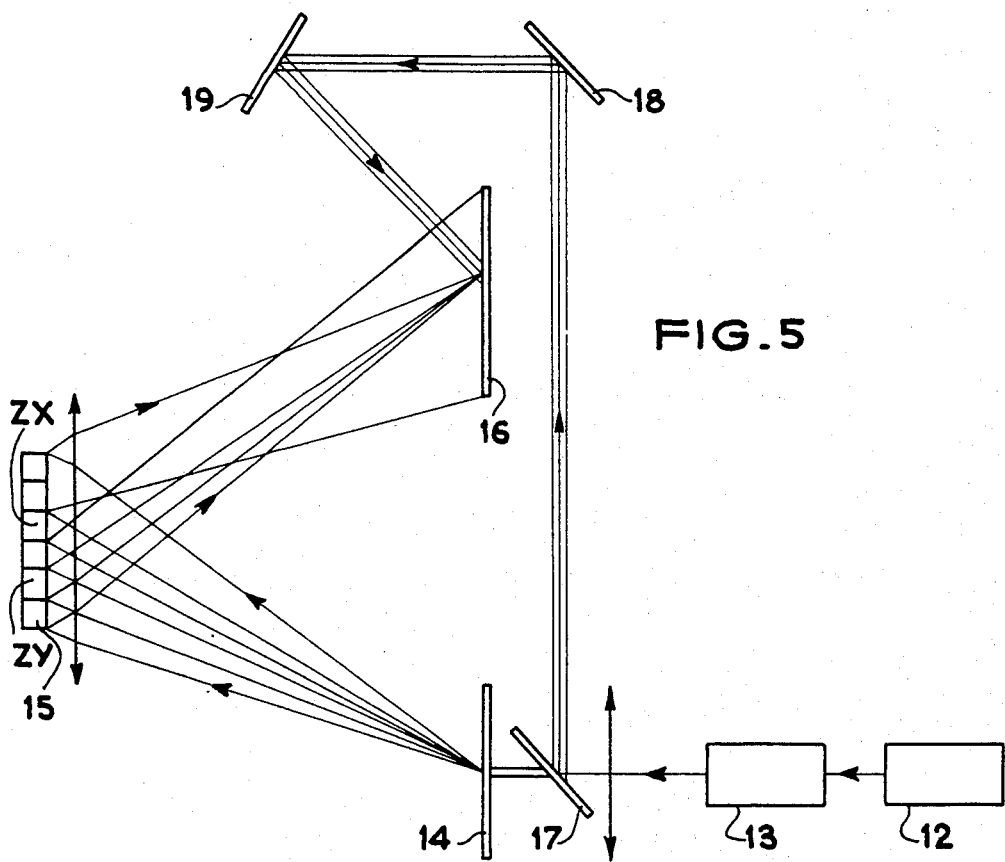
FIG. 5 is a diagram of a unit for recording holographic optical memories in which the converting device according to the invention is employed.

FIG. 5 shows by way of example a unit for recording holographic memories. This unit comprises a source of coherent light 12, for example a laser, which sends light to a deflector 13 whereby it is possible to sweep the light beam over a matrix of holographic lenses 14 having as many lenses as there are active studs in the converting device employed. This device carries the reference number 15 in FIG. 5 and is disposed in such manner as to receive the light from the matrix 14. The matrix is preferably of the type described in French Pat. No. 72 11,213 filed on Mar. 30, 1972.

The light impinging on the reflecting surface of the membrane of the converting device is sent to a photosensitive holographic plate 16 which also receives a reference beam sent from the laser 12 by reflection on suitably arranged mirrors 17, 18 and 19.

The recording of the plate 16 is carried out sequentially by acting on both the deflector 13 and the excitation of the converting device 16. It can be seen that, when a given zone ZX of this device is in the 0 state, the light impinging on this zone is dispersed and insufficient to print a corresponding zone of the photosensitive plate.

If, on the other hand, a zone ZY is in the 1 state the light received is reflected in a specular manner and is therefore capable of printing the corresponding zone of the plate.

Thus it is possible to print the whole of the plate 16 in accordance with different logic states as a function of the excitation of the converting device according to the invention.

A converting device may have the following characteristics:

| | |
|---|---|
| Number of variable-reflection zones | $10^5$ to $10^6$ |
| Dimension of a zone | 300μ |
| Pitch between the zones | 400μ |
| Total dimension of the device | between 12×12cm and 40×40cm |
| Contrast response time : | exceeding 100 |
| in the case of memory recording | 3μs/line |
| in the case of display | 50μs/line |
| Complete charging time : | |
| in the case of recording | 1 m.sec. |
| in the case of display | 20 m.sec. |

It will be understood that the converting device according to the invention may be in a form other than that just described. In particular, the form of the studs may be modified and they may be disposed in another way etc. without departing from the scope of the invention.

Having now described our invention what we claim as new and desire to secure by Letters Patent is:

1. In a device for converting electrical data into optical data, comprising a flexible magnetic sheet which is reflective on one of its sides, a network of magnetic circuits having a base plate of a magnetic material and being associated with a network of as many zones of said sheet for selectively deforming each one of said zones by a modification of the magnetic flux in their associated magnetic circuit and a matrix of exciting means having input means for said electrical data so as to be controlled by said electrical data for varying said magnetic flux and selectively modifying the conditions of reflection in said zones as a function of the electrical data, the improvement wherein said network of magnetic circuits comprises a network of studs of the same magnetic material as said base plate, said studs projecting from said base plate and being integral therewith, said network of magnetic studs comprising a group of first studs fixing said sheet in position and a group of second studs confronting said zones of said sheet, the second studs being slightly shorter than the first studs so as to define between their ends and said sheet a slight airgap in absence of electrical excitation and said exciting means comprising a matrix of crossed linearly disposed wires forming loops located on the bottom of the grooves defined between said first and second studs.

2. A device as claimed in claim 1, wherein said sheet has a hard magnetic material having a high coercive field, each of said zones is premagnetized and the combination of each magnetic circuit and its associated zone possesses two stable reluctance states in the absence of electrical excitation.

3. A device as claimed in claim 1, wherein said sheet is constituted by a support layer of plastics material coated with a layer of magnetic material.

4. A device as claimed in claim 3, wherein said layer of plastics material is reduced in thickness in the region of each one of said zones.

5. A device as claimed in claim 4, wherein said sheet has a hard magnetic material having a high coercive field, each of said zones is premagnetized and the combination of each magnetic circuit and its associated zone possesses two stable reluctance states in the absence of electrical excitation.

6. A device for converting electrical data into optical data, comprising a flexible magnetic sheet constituted by a support layer of plastics material coated with a layer of magnetic material, said sheet being reflective on one of its sides, a network of magnetic circuits associated with a network of as many zones of said sheet for selectively deforming each one of said zones by a modification of the magnetic flux in their associated magnetic circuit and a matrix of exciting means having input means for said electrical data so as to be controlled by said electrical data for varying said magnetic flux and selectively modifying the conditions of reflection in said zones as a function of the electrical data, said magnetic circuits being constituted by a base plate and a network of studs projecting from the plate, said network of studs comprising a group of first studs fixing said sheet in position and a group of second studs confronting said zones of the sheet, the second studs being slightly shorter than the first studs, said layer of plastics material being apertured in the region of each one of said zones.

7. A device as claimed in claim 6, wherein said exciting means comprise crossed networks of conductive loops respectively arranged around rows and columns of said second studs for electrically exciting said second studs in the manner of a matrix.

8. A device as claimed in claim 7, wherein said base plate and said network of magnetic circuits are made from a soft magnetic material having a low coercive field and a square hysteresis loop.

9. A device as claimed in claim 6, wherein said base plate and said network of magnetic circuits are made from a soft magnetic material having a low coercive field and a square hysteresis loop.

10. A unit for recording holographic optical memories comprising: a converting device comprising a flexible magnetic sheet constituted by a support layer of plastics material coated with a layer of magnetic material, said sheet being reflective on one of its sides, a network of magnetic circuits associated with a network of as many zones of said sheet for selectively deforming each one of said zones by a modification of the magnetic flux in their associated magnetic circuit, and a matrix of exciting means having input means for said electrical data so as to be controlled by said electrical data for varying said magnetic flux and selectively modifying the conditions of reflection in said zones as a function of the electrical data, said magnetic circuits being constituted by a base plate and a network of studs projecting from the plate, said network of studs comprising a group of first studs fixing said sheet in position and a group of second studs confronting said zones of the sheet, the second studs being slightly shorter than the first studs, said layer of plastics material being apertured in the region of each one of said zones; a source of coherent light producing a beam; deflecting and deviating means for illuminating in the manner of a matrix the reflective side of said sheet in each one of said zones with said beam; a photosensitive material adapted to constitute said memory; and means for interfering the light reflected by said sheet with a reference beam emerging from said source on said photosensitive material.

* * * * *